(12) United States Patent
Luka et al.

(10) Patent No.: US 6,393,803 B1
(45) Date of Patent: May 28, 2002

(54) PROCESS FOR COATING BLOW-MOLDED PLASTIC CONTAINERS

(75) Inventors: Gregory J. Luka, York; John W. Tobias, Lancaster, both of PA (US)

(73) Assignee: Graham Packaging Company, L.P., York, PA (US)

(*) Notice: Subject to any disclaimer, the term of this patent is extended or adjusted under 35 U.S.C. 154(b) by 0 days.

(21) Appl. No.: 09/434,904

(22) Filed: Nov. 5, 1999

Related U.S. Application Data

(60) Provisional application No. 60/107,483, filed on Nov. 6, 1998.

(51) Int. Cl.[7] .............................................. B65B 61/02
(52) U.S. Cl. .............................. 53/411; 53/452; 53/467; 117/97; 117/95
(58) Field of Search .......................... 53/411, 452, 453, 53/467, 471, 473, 559; 117/97, 95, 101, 66; 428/35.1, 215

(56) References Cited

U.S. PATENT DOCUMENTS

| | | | |
|---|---|---|---|
| 2,985,542 A | * 5/1961 | Pinsky et al. | |
| 3,120,679 A | * 2/1964 | Price et al. | |
| 3,217,357 A | * 11/1965 | Martin | |
| 3,547,294 A | 12/1970 | Williams | 215/1 |
| 3,804,663 A | 4/1974 | Clark | 117/101 |
| 3,833,406 A | 9/1974 | White | 117/97 |
| 3,902,453 A | 9/1975 | Frische | 118/322 |
| 3,951,101 A | * 4/1976 | Karakawa et al. | 118/301 |
| 4,069,933 A | * 1/1978 | Newing | 215/1 C |
| 4,208,852 A | * 6/1980 | Pioch | 53/167 |
| 4,254,170 A | 3/1981 | Roullet et al. | 428/36 |
| 4,267,143 A | 5/1981 | Roullet | 264/516 |
| 4,275,097 A | * 6/1981 | Shriver | 427/286 |
| 4,311,250 A | 1/1982 | Ravve et al. | 220/458 |
| 4,391,381 A | 7/1983 | Ota et al. | 215/1 |
| 4,479,772 A | * 10/1984 | Kleimenhagen | 425/526 |
| 4,515,836 A | 5/1985 | Cobbs, Jr. et al. | 427/425 |
| 4,569,869 A | 2/1986 | Kushida et al. | 428/35 |
| 4,730,575 A | 3/1988 | Jenkins | 118/47 |
| 4,790,741 A | * 12/1988 | Takakusaki et al. | 425/526 |
| 4,809,640 A | 3/1989 | Pilley et al. | 118/257 |
| 4,818,571 A | 4/1989 | Pilley et al. | 427/286 |
| 5,308,233 A | * 5/1994 | Denis et al. | 425/151 |
| 5,308,649 A | 5/1994 | Babacz | 427/562 |
| 5,683,729 A | 11/1997 | Valles | 425/526 |

FOREIGN PATENT DOCUMENTS

| | | |
|---|---|---|
| WO | WO 98/47770 | 10/1998 |

* cited by examiner

*Primary Examiner*—Rinaldi I. Rada
*Assistant Examiner*—Sameh Tawfik
(74) *Attorney, Agent, or Firm*—Howson and Howson

(57) ABSTRACT

A process for blow-molding and coating plastic containers under conditions of positive control in a close-coupled, compact machine to enhance operational efficiency. According to one of the preferred methods, the containers are coated promptly after the containers are discharged from hot molds to take advantage of the residual heat of the freshly blown containers to enhance curing/drying of the coating and to enhance bonding of the coating to the container surface. According to another one of the preferred methods, the containers are aseptically filled and capped either before or after the containers are coated. Alternatively, the process can include hot-filling and capping of containers in which the containers are coated promptly after being hot-filled to take advantage of the elevated temperature of the hot-filled containers.

18 Claims, 3 Drawing Sheets

PROCESS FOR COATING BLOW-MOLDED PLASTIC CONTAINERS

This application claims benefit of Provisional No. 60/107,483 filed Nov. 6, 1998.

The present invention relates to coating surfaces of blow-molded plastic containers, and more particularly, the present invention relates to a process for continuously blow-molding and coating plastic containers which are retained under positive control throughout the molding and coating processing steps.

BACKGROUND OF THE INVENTION

It is known to provide a coating on blow-molded plastic containers and to cure the applied coating. The coatings can include colorants, ultra-violet light protectors, barrier materials and the like, and can be applied on the inside or outside surfaces of the containers. For examples of patents disclosing methods of applying coatings to containers, see U.S. Pat. No. 4,515,836 issued to Cobbs, Jr. et al.; U.S. Pat. No. 4,569,869 issued to Kushida et al.; U.S. Pat. No. 4,809,640 and U.S. Pat. No. 4,818,571 issued to Pilley et al.; U.S. Pat. No. 4,730,575 issued Jenkins; U.S. Pat. No. 3,902,453 issued to Frische; U.S. Pat. No. 5,308,649 issued to Babacz; U.S. Pat. No. 4,391,381 issued to Ota et al.; U.S. Pat. No. 3,804,663 issued to Clark; U.S. Pat. No. 3,833,406 issued to White; U.S. Pat. No. 4,331,250 issued to Rawe et al.; and U.S. Pat. Nos. 4,254,170 and 4,267,143 issued to Roullet.

One known process for manufacturing containers includes injection molding preforms of plastic, such as PET, and blow-molding the preforms in a mold cavity. The finish of the preform can be retained under positive control while the preform is processed through blow molding machinery. The positive control can be accomplished by equipment which grasps the neck of each preform such as disclosed in U.S. Pat. No. 5,683,729 issued to Valles.

After molding, the resulting containers are discharged from the mold and released from positive control by, for instance, being placed on a transfer conveyor which leads to further operations such as packing and shipping operations. It is also known to transfer the containers via transfer conveyors to other stations which accomplish further operations such as filling and capping.

As discussed previously, further operations can also include applying a coating to the exterior surface of the container and curing, or drying, the coating on the container. Conventional coating/curing operations are carried out in machinery separate and apart from blowing, filling and capping equipment. Thus, conventional coating equipment requires additional floor space, transfer conveyors and container handling apparatus, and creates an increased potential for container contamination.

U.S. Pat. No. 3,547,294 issued to Williams discloses a continuous process of extrusion blow molding a container, promptly applying a coating on a surface of the container, and then, filling and capping the container. The coating disclosed in Williams is for sealing in the flavor of the liquid stored in the container or for protecting the liquid from ultra-violet light. The Williams patent also discloses applying the coating in a refrigerated atmosphere, or alternatively, in a heating chamber.

Although various ones of the above-referenced methods for coating containers may be satisfactory for their intended purposes, there is a need for an improved coating method which reduces the required floor space for machinery, increases the handling efficiency of preforms and containers, eliminates contamination of the preforms and containers, and reduces the number of required transfer conveyors. In addition, the method according to the present invention applies the coating to the containers when the containers are at elevated temperatures due to being freshly blown, or freshly hot-filled, so that curing of the coating is initiated and bonding of the coating to the container surface is improved.

OBJECTS OF THE INVENTION

With the foregoing in mind, an object of the present invention is to provide a novel process for efficiently blow-molding and coating plastic containers.

Another object of the present invention is to provide an improved process for handling preforms and resultant blown containers from the time they enter blow molding machinery until after they have been coated.

A further object of the present invention is to provide a unique process for efficiently curing a coating applied to either an empty, or a hot-filled, container.

As another object, the present invention provides an improved coating process for maintaining sterility of the containers during blowing, coating, curing, filling and capping operations.

SUMMARY OF THE INVENTION

More specifically, in the process of the present invention, a plurality of preforms are advanced in sequence under positive control into a blow-mold where they are blow-molded into containers. The blown containers are discharged from the blow-mold under positive control and at an elevated temperature. Thereafter, the containers are coated while remaining under positive control and while being at an elevated temperature. Thus, the preforms and resulting containers are maintained under continuous positive control throughout the entire container blow-molding and coating process, and curing and bonding of the coating is initiated and enhanced by the elevated temperature of the containers at the time of coating. Also, curing temperatures can be elevated, for instance, from 150° F. to 190° F., due to heat set blow molding processes and to the low moisture content of the container at the time of curing. The elevated curing temperatures reduce the required curing time and increase the speed of the overall process.

Preferably, the coating is promptly applied to empty containers after being discharged from hot blow molds to take advantage of the residual heat of the containers to initiate drying and curing of the coating. Alternatively, the blow molded bottles are first hot-filled and capped before being promptly coated to take advantage of the residual heat of the hot-filled containers to initiate drying and curing of the coating.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED PROCESSES

Figure 1:
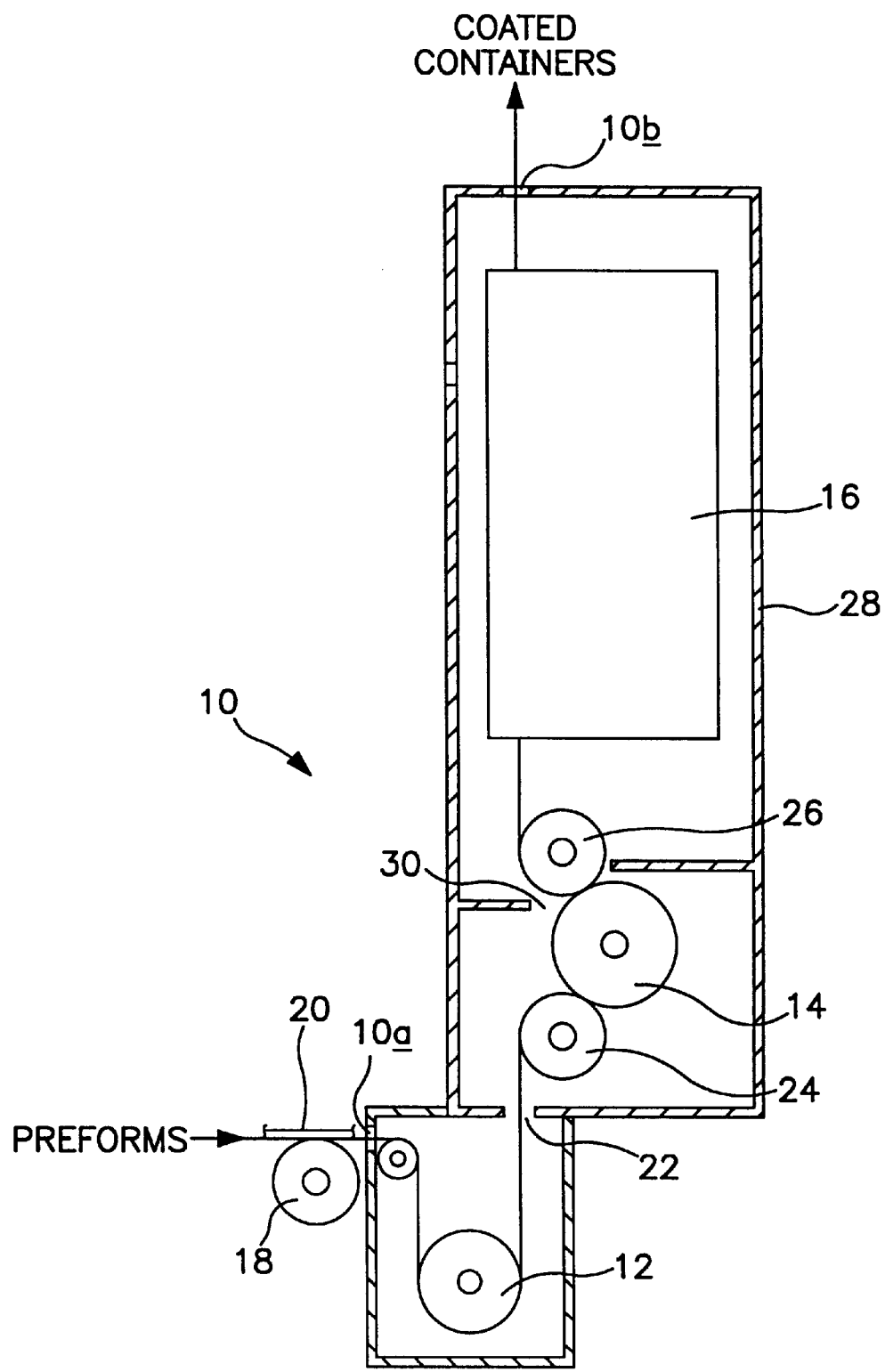
FIG. 1 is schematic diagram of an apparatus used to manufacture coated containers according to a first preferred method of the present invention.

Referring now to the drawings, FIG. 1 illustrates schematically, in plan view, an apparatus 10 for practicing one of the preferred processes of the present invention.

As illustrated therein, the apparatus 10 includes a series of work stations disposed in a horizontally-elongate, compact, plant floor plan. The apparatus 10 includes a pre-heat oven 12, a blow-molder 14, and a coating machine 16 which are close-coupled into an integrated unit. Injection molded preforms are admitted into the apparatus 10 at an upstream location 10a, (lower left in FIG. 1), and coated empty containers exit apparatus 10 through exit port 10b (top) for packaging and transportation to filling and capping locations.

The pre-heat oven 12 contains a chain-type conveyor onto which pre-forms are mounted by means of a star-wheel 18 and guide rail 20 and transported in spaced relation in a open-loop path, first in one direction, and then in the opposite direction, toward the blow-molder 14. In the pre-heat oven 12, the preforms are heated by various known techniques, such as radiant heaters, to raise their temperatures to a temperature suitable for blow-molding (eg. the glass transition temperature, Tg). The pre-heat oven 12 is connected to the blow-molder 14 by means of an open aperture 22 through which heated preforms pass.

The preforms are disengaged from the pre-heat oven conveyor and transferred to the blow-molder by means of a positive grip transfer wheel 24 disposed between the pre-heat oven conveyor and the blow-molder 14. The heated preform is transferred to a blow-molding wheel which rotates about a vertical axis to blow the preform into the desired shape of the container as the wheel rotates in a counter clockwise direction in the blow-molder 14. Blow-molded containers are discharged from the blow-molder 14 by means of a downstream positive grip transfer wheel 26 like in construction to its companion upstream positive grip transfer wheel 24.

As described thus far, the pre-heat oven 12 and blow-molder 14 are of commercially available design and construction. A preferred pre-heat oven 12 and blow-molder 14 is manufactured by Sidel of Octeville, France. Blown containers discharged from such a blow-molder 14 have heretofore simply been transferred via conventional conveyors to other locations in a plant for coating, curing, sterilizing, filling, and/or capping, or packed for shipment to other plant locations.

According to the present invention, the blow-molder 14 is connected directly to a horizontally-elongate cabinet 28 which contains the coating machinery 16. The blown containers are transferred under conditions of positive control, not only through the pre-heat oven 12 and blow-molder 14, but also through the downstream coating machinery in the cabinet 28 which is close-coupled to the blow-molder 14.

To this end, the cabinet 28 is connected to the blow-molder 14 by means of a port 30 through which the blown containers are first transferred to the coating equipment 16. The coating equipment 16 is of a conventional design which utilizes spraying, dipping or other known means of applying a coating of a colorant, ultra-violet light protector, barrier material, or like coating to surfaces of containers, such as the exterior surface of each container. After coating, or after coating/drying/curing, the coated empty containers exit the coating equipment 16 and cabinet 28 via exit port 10b. The empty coated containers can then be shipped, stored or transferred to further plant stations, such as sterilizing, filling, and capping stations.

By way of example, and not by way of limitation, the above referenced containers could be made of PET and the above referenced coating could be a barrier material such as epoxy-amine. The temperature of the freshly blown containers as they are discharged from the hot blow molds is in the range of about 100° F. to about 200° F. The coating is applied promptly to the freshly blown containers so that, at the time of coating, the temperature of the container is at least about 75° F.

Several advantages are achieved when the containers are coated according to the above-described process. Firstly, the residual heat associated with containers freshly blown in hot molds initiates drying and curing of the coating and reduces the required overall drying and curing processing time. Secondly, when immediately coated, the surfaces of the freshly blown containers are pristine and free from dust and other contamination. This is not true in prior art coating technology which inherently delays coating of the containers, for instance, until after the containers are transported to distant plant coating station locations. Thirdly, the molecular energy of the surface of a blown container is highest when it is discharged from the blow molder. Thus, if a coating is applied to a blown container immediately after it is discharged from the blow molder, the surface of the container will attract the coating particles more efficiently then if the coating were applied at a later time.

Thus, the above described method according to the present invention provides an efficient process of blowing and coating containers. In addition, the close coupled system reduces the total required floor space for the machinery by eliminating various container transfer conveyors and handling mechanisms required in conventional, separate blow molding and coating apparatus.

Figure 2:
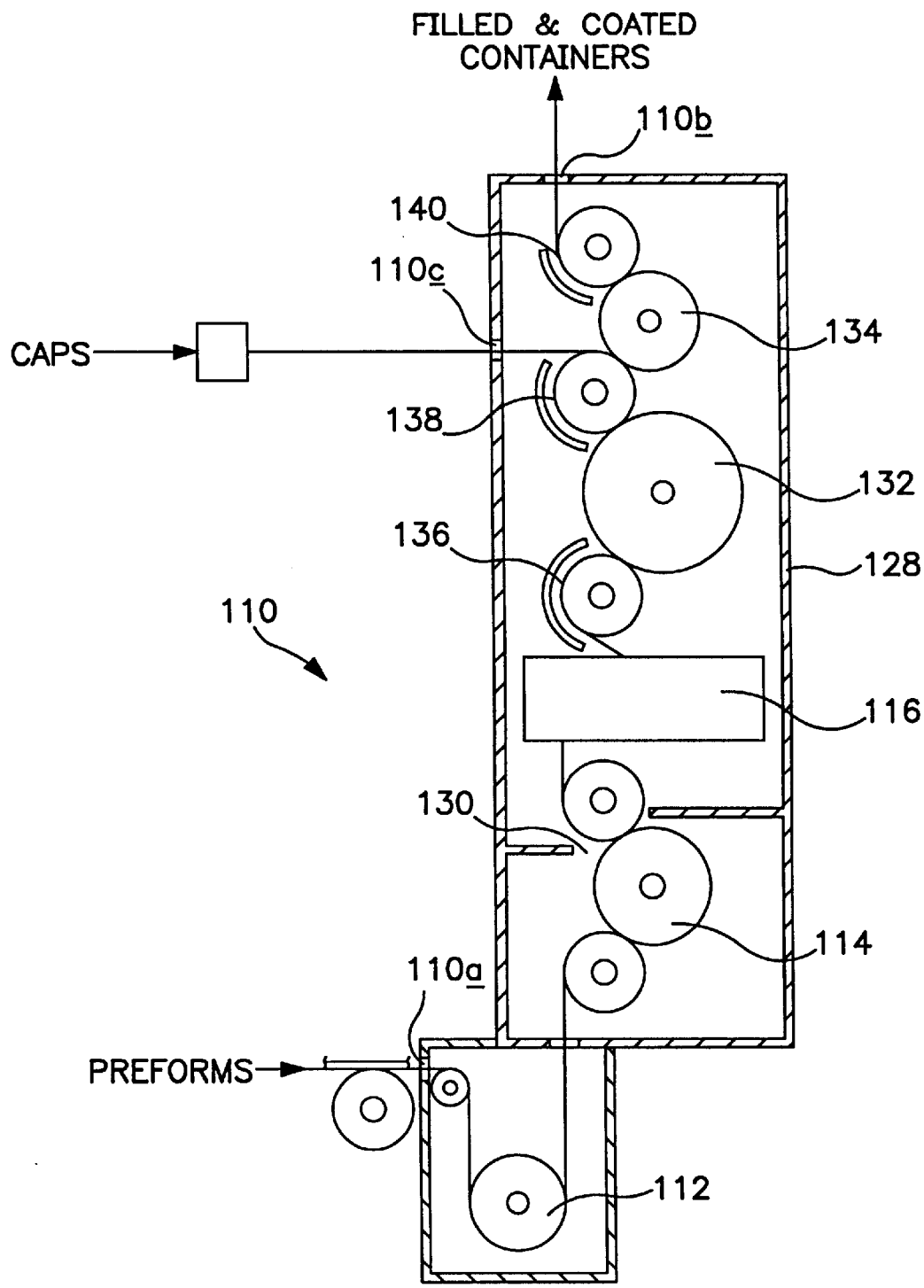
FIG. 2 is schematic diagram of an apparatus used to produce aseptically filled, capped and coated containers according to a second preferred method of the present invention.

Referring now to FIG. 2, an apparatus 110 for practicing a second preferred process of the present invention is illustrated schematically in plan view. Apparatus 110 differs from the above-described apparatus 10 in that the coated containers are also filled and capped in the closed coupled system, preferably in an aseptic environment. Positive control of the preforms/containers is maintained throughout blowing, coating, filling and capping.

As illustrated therein, the apparatus 110 includes a series of work stations disposed in a horizontally-elongate, compact, plant floor plan. The apparatus 110 includes a pre-heat oven 112, a blow-molder 114, a coating apparatus 116, a filler 132, and a capper 134 which are close-coupled into an integrated, fully-enclosed unit.

The injection molded preforms are admitted into the apparatus 110 at an upstream location 110a, (lower left in FIG. 2), and caps are admitted into the apparatus 110 at a downstream location 110c (upper left in FIG. 2) adjacent an exit port 110b (top) through which coated, aseptically filled and capped containers exit for packaging and transportation to the ultimate consumer.

The pre-heat oven 112, blow molder 114 and coating apparatus 116 function similar to those described above in the apparatus 10 of FIG. 1.

The blow-molder 114 is connected directly to a horizontally-elongate cabinet 128 which contains the coating equipment 116, the filler 132, and the capper 134. The blown containers are transferred under conditions of positive control, not only through the pre-heat oven 112 and blow-molder 114, but also through the downstream coating and aseptic filling and capping stations in a common cabinet 128 which is close-coupled to the blow-molder 114.

To this end, the cabinet 128 is connected to the blow-molder 114 by means of a port 130 through which the blown containers are first transferred to the coating equipment 116. After the containers have been coated and cured, they are transferred from the coating equipment 116 via a positive star-wheel/guide rail system 136 to the filler 132 in the cabinet 128. The filler 132 is of conventional rotary design. In it, the coated containers advance in an arcuate path about a vertical axis where they are sequentially filled to a predetermined level before being discharged and transferred by another positive star-wheel/guide rail system 138 to the capper 134 in the cabinet 128. The filled containers advance in an arcuate path about a vertical axis in the capper 134 and, after being capped, are discharged by another positive star-wheel/guide rail system 140.

As illustrated in FIG. 2, after the blown containers exit the blow-molder, they advance in a continuous path through the coating, filling and capping stations under conditions of continuous positive control. In the present invention, continuous positive control is preferably effected by gripping the preform about its neck finish by known apparatus, for instance, by means of a set of opposed grippers (not shown).

The various items of equipment described, including the pre-heat conveyor, blow-molder, coating equipment, filler and capper may be driven by a common power source through appropriate gearing, or may be driven by separate motors interconnected by means of electrical controls designed to synchronize the movement of the various items of equipment.

Preferably, the cabinet 128 containing the coating equipment, filler and capper excludes outside, unfiltered air except for the regions through which the blown containers, caps and filled containers enter and exit, respectively. To this end, flowing sterile air passes down through an overhead filter means over the equipment in cabinet 128. Appropriate air interlocks can be provided at certain locations, such as air curtains at 110b and 110c, to separate the relatively sterile environment contained within the cabinet 128 from ambient air.

Thus, the above described method of coating containers as illustrated in FIG. 2 provides all the advantages of that illustrated in FIG. 1 and results in the production of aseptically filled, capped and coated containers.

Figure 3:
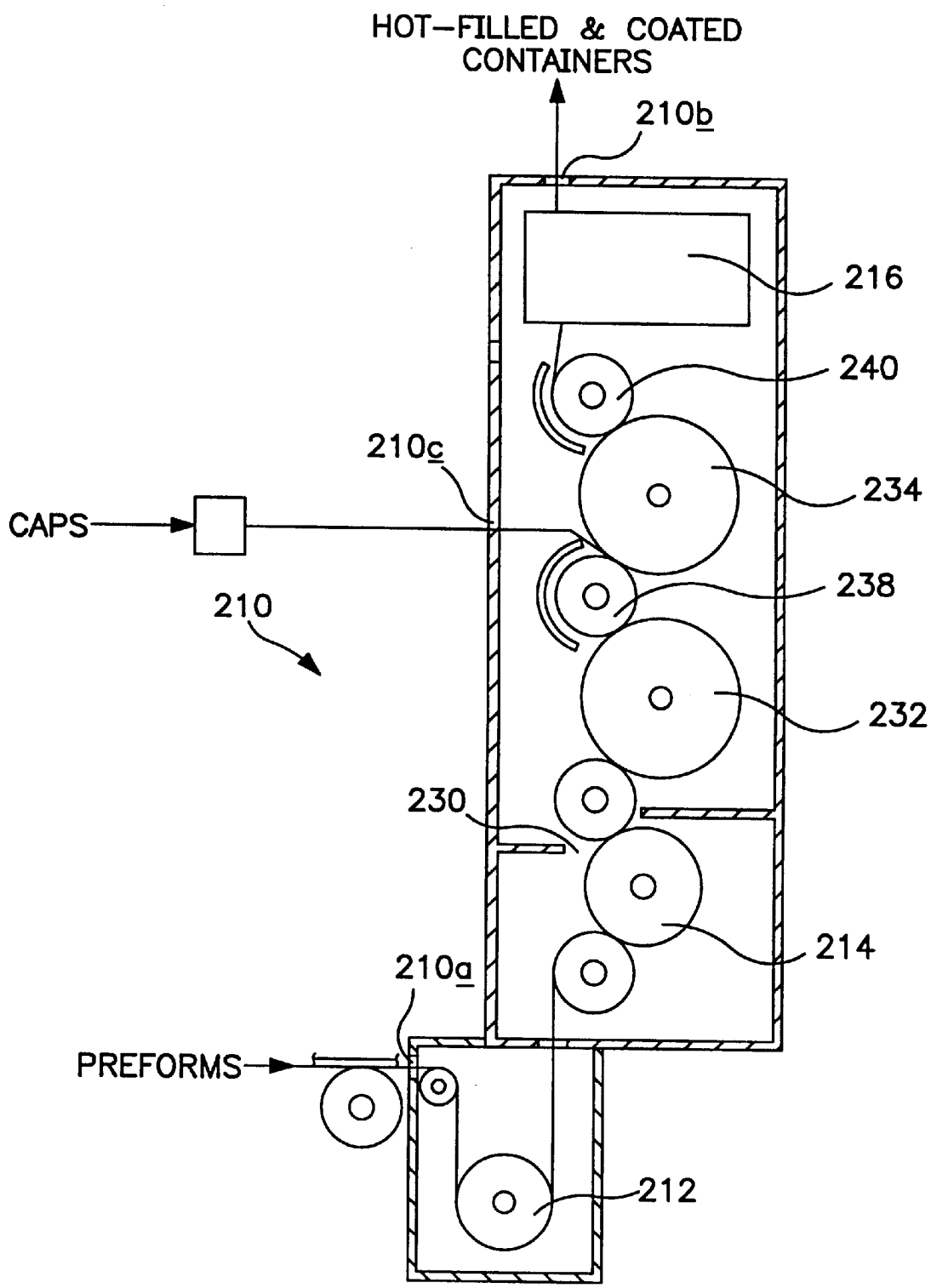
FIG. 3 is schematic diagram of an apparatus used to produce hot-filled, capped and coated containers according to a third preferred method of the present invention.

Referring now to FIG. 3, an apparatus 210 for practicing a third preferred process of the present invention is illustrated schematically in plan view. Apparatus 210 differs from the above-described apparatus 10 and 110 in that the containers are first hot-filled and capped before being coated. Positive control of the preforms/containers is maintained throughout blowing, hot-filling, capping and coating of the containers.

As illustrated therein, the apparatus 210 includes a series of work stations disposed in a horizontally-elongate, compact, plant floor plan. The apparatus 210 includes a pre-heat oven 212, a blow-molder 214, a hot-filler 232, a capper 234, and coating equipment 216 which are close-coupled into an integrated, fully-enclosed unit.

The injection molded preforms are admitted into the apparatus 210 at an upstream location 210a, (lower left in FIG. 3), and caps are admitted into the apparatus 210 at a downstream location 210c, (upper left in FIG. 3) adjacent an exit port 210b (top) through which hot-filled, capped and coated containers exit for packaging and transportation to the ultimate consumer.

The pre-heat oven 212, blow molder 214 and coating apparatus 216 function similar to those described above in the apparatus 10 of FIG. 1.

The blow-molder 214 is connected directly to a horizontally-elongate cabinet 228 which contains the hot-filler 232, the capper 234 and the coating equipment 216. The blown containers are transferred under conditions of positive control, not only through the pre-heat oven 212 and blow-molder 214, but also through the downstream hot-filling, capping and coating stations in a common cabinet 228 which is close-coupled to the blow-molder 214.

To this end, the cabinet 228 is connected to the blow-molder 214 by means of a port 230 through which the blown containers are transferred to the hot-filling equipment 232. The hot-filler 232 is of conventional rotary design. In it, the containers advance in an arcuate path about a vertical axis where they are sequentially filled to a predetermined level before being discharged and transferred by a positive star-wheel/guide rail system 238 to the capper 234 in the cabinet 228. The filled containers advance in an arcuate path about a vertical axis in the capper 234 and, after being capped, are discharged into the coating equipment 216 by another positive star-wheel/guide rail system 240. Preferably, before a coating is applied to each container, excess moisture is removed such as by a blast of air (not shown).

As illustrated in FIG. 3, after the blown containers exit the blow-molder, they advance in a continuous path through the hot-filling, capping and coating stations under conditions of continuous positive control. In the present invention, continuous positive control is preferably effected by gripping the preform about its neck finish by known apparatus, for instance, by means of a set of opposed grippers.

The various items of equipment described, including the pre-heat conveyor, blow-molder, coating equipment, hot-filler and capper may be driven by a common power source through appropriate gearing, or may be driven by separate motors interconnected by means of electrical controls designed to synchronize the movement of the various items of equipment.

Thus, the above described method of coating containers as illustrated in FIG. 3 provides similar advantages of that illustrated in FIGS. 1 and 2. For instance, since typical hot-fill temperatures are about 180° F. to 195° F., the high temperature of the container immediately after being hot-filled, typically about 170° F., initiates the drying and curing process of the coating on the container.

From the foregoing, it should be apparent that the present invention provides an efficient process for blowing, coating, capping and filling containers, wherein preforms and the containers blown therefrom are maintained continuously in positive control throughout the entire process from preheating through capping and/or coating. This is achieved by eliminating non-positive transfer points. In the present invention, positive control is maintained by means which grip each container finish throughout the entire process and advance it in a continuous path. By eliminating screw container body gripping via conveyors, linear conveyors, and transfer mechanisms for them, the proclivity to jam is eliminated, and the efficiency of the entire process is significantly enhanced. Blowing, filling, capping and coating systems are often changed over from one size bottle to another. In the prior art, this required changing screw conveyors, star-wheels and adjusting guide rails. If the adjustment was not perfect, jams occurred on restart. Since the positive transfer occurs at the unchanging neck finish, a size changeover merely requires changing the blow-molds and restarting the machine. This further increases overall efficiency.

As used herein, the term container is intended to encompass bottles, jars and like receptacles for containing fluent materials.

Although not illustrated, sterilizing equipment could also be included in any of the above described methods to sterilize and rinse empty containers whether coated or not.

In view of the foregoing, it should be apparent that the present invention provides an improved process and apparatus for blowing, coating, filling and capping blow-molded containers in an efficient manner utilizing close coupled equipment that occupies a minimum of plant floor space.

What is claimed is:

1. A process for applying a coating to plastic containers blown from pre-forms having neck finishes, comprising the steps of:

transferring a plurality of preforms in sequence into a blow-mold;

blowing the preforms into containers in the blow-mold;

discharging the blown containers from said blow-mold, the temperature of said discharged containers being at least 100° F.;

applying a coating to the blown containers, the temperature of said containers being at least 75° F. when coated; and continually gripping the neck finish of each preform and container blown therefrom with a set of grippers throughout said transferring, blowing, discharging, and applying steps, said grippers transporting each preform and container blown therefrom under continuous positive control throughout the entire container blow-molding and coating process, whereby curing and bonding of the coating is enhanced by the elevated temperature of said containers when coated.

2. The process according to claim 1, wherein said blown containers are applied with a coating on their exterior surfaces.

3. The process according to claim 2, wherein said coating is a colorant.

4. The process according to claim 2, wherein said coating is an ultraviolet light protector.

5. The process according to claim 2, wherein said coating is a barrier material.

6. The process according to claim 1, further comprising the step of curing said coating.

7. The process according to claim 1, further comprising the steps of:

advancing a plurality of preforms in sequence under positive control while pre-heating them in an oven; and transferring the preforms under positive control from said pre-heat oven into said blow molds.

8. The process according to claim 1, wherein said blow-mold is a hot mold.

9. A process according to claim 1, further comprising the step of curing said coating at a predetermined temperature after said coating is applied to the blown containers, wherein, since the blown containers have a low moisture content, said predetermined curing temperature is capable of being relatively high which thereby reduces curing time.

10. A process for applying a coating to plastic containers blown from pre-forms having neck finishes, comprising the steps of:

transferring a plurality of preforms in sequence into a blow-mold;

blowing the preforms into containers in the blow-mold;

discharging the blown containers from said blow-mold, the temperature of said discharged containers being at least 100° F.; and applying a coating to the blown containers, the temperature of said containers being at least 75° F. when coated;

filling the containers;

capping the containers; and continually gripping the neck finish of each preform and container blown therefrom with a set of grippers throughout said transferring, blowing, discharging, applying, filling and capping steps, said grippers transporting each preform and container blown therefrom under positive control throughout the entire container blow-molding and coating process;

whereby curing and bonding of the coating is enhanced by the elevated temperature of said containers when coated.

11. The process according to claim 10, wherein said blown containers are coated in said coating step promptly after being discharged from said blow mold and before said blown containers are filled and capped in said filling and capping step.

12. The process according to claim 11, wherein said blow-molding step, said coating step, said filling step and said capping step take place in an enclosed aseptic environment.

13. The process according to claim 10, wherein said blown containers are coated in said coating step after said blown containers are filled and capped in said filling and capping step.

14. The process according to claim 13, wherein said blown containers are filled in said filling step with liquid having a filling temperature of at least 180° F., and wherein said containers are coated in said coating step before the temperature of said hot-filled containers falls below 150° F.

15. A process for applying an exterior coating to plastic containers blown from pre-forms having neck finishes, comprising the steps of:

transferring a plurality of preforms in sequence into a blow-mold;

blowing the preforms into containers in the blow-mold;

discharging the blown containers from said blow-mold, said containers having a temperature of at least about 100° F. when discharged from said blow mold;

promptly applying a coating to the blown containers after said containers are discharged from the blow mold and before the temperature of said containers decrease to about 75° F.;

after said coating step, filling the containers and capping the filled containers; and continually gripping the neck finish of each preform and container blown therefrom with a set of grippers throughout said transferring, blowing, discharging, applying, filling and capping steps, said grippers transporting each preform and container blown therefrom under positive control continuously throughout said entire process.

16. A process for applying an exterior coating to plastic containers blown from pre-forms having neck finishes, comprising the steps of:

transferring a plurality of preforms in sequence into a blow-mold;

blowing the preforms into containers in the blow-mold;

discharging the blown containers from said blow-mold;

hot-filling the containers discharged from said blow mold;

capping the hot-filled containers after said hot-filling step;

applying a coating to the containers promptly after hot-filling and capping the containers while the containers are still hot from hot-filling; and continually gripping the neck finish of each preform and container blown therefrom with a set of grippers throughout said transferring, blowing, discharging, hot-filling, capping and applying steps, said grippers transporting each preform and container blown therefrom under positive control continuously throughout said entire process.

17. The process according to claim 16, wherein said blown containers are filled in said filling step with liquid having a filling temperature of at least 180° F., and wherein said containers are coated in said coating step before the temperature of said hot-filled containers falls below 150° F.

18. A process for applying an exterior coating to plastic containers having neck finishes, comprising the steps of:

hot-filling the containers with a liquid having a temperature of at least about 180° F.;

capping the hot-filled containers;

applying a coating to the containers promptly after hot-filling and capping the containers before the temperature of the containers decreases below 150° F.; and continually gripping the neck finish of each container with a set of grippers throughout said hot-filling, capping, and applying steps, said grippers transporting each preform and container blown therefrom under positive control throughout the entire container filling, capping and coating process;

whereby curing and bonding of the coating is enhanced by the elevated temperature of said containers when coated.

* * * * *